Figure 1:
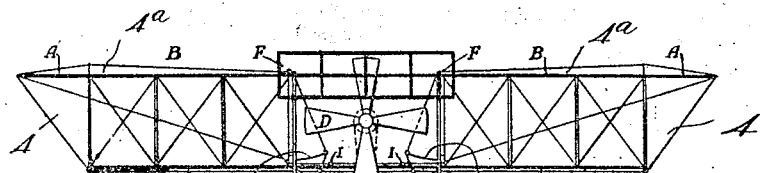

W. F. WILES, T. MACLEOD & F. W. WILES.
AEROPLANE.
APPLICATION FILED OCT. 19, 1911.

1,076,339.

Patented Oct. 21, 19

2 SHEETS—SHEET

W. F. WILES, T. MACLEOD & F. W. WILES.
AEROPLANE.
APPLICATION FILED OCT. 19, 1911.
1,076,339.
Patented Oct. 21, 1913.
2 SHEETS—SHEET 2.
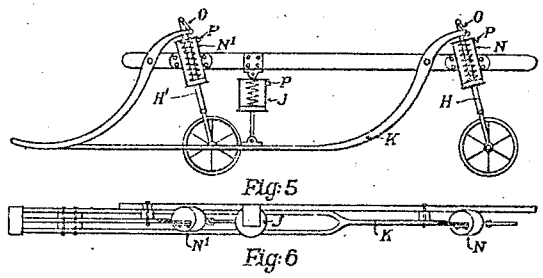
Fig. 5
Fig. 6
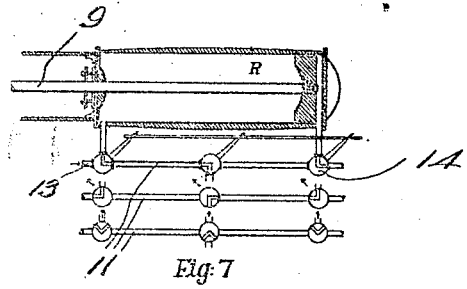
Fig. 7
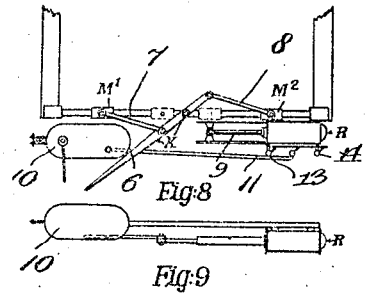
Fig. 8
Fig. 9

UNITED STATES PATENT OFFICE.

WILLIAM FRANCIS WILES, THOMAS MACLEOD, AND FREDERICK WILLIAM WILES, OF BRISBANE, QUEENSLAND, AUSTRALIA.

AEROPLANE.

1,076,339.  Specification of Letters Patent.  Patented Oct. 21, 1913.

Application filed October 19, 1911. Serial No. 655,483.

*To all whom it may concern:*

Be it known that we, WILLIAM FRANCIS WILES, THOMAS MACLEOD, and FREDERICK WILLIAM WILES, subjects of the King of the United Kingdom of Great Britain and Ireland, residing at Brisbane, in the State of Queensland, Commonwealth of Australia, have invented certain new and useful Improvements in Improved Aeroplanes; and we do hereby declare the following to be a full, clear, and exact description of the invention, such as will enable others skilled in the art to which it appertains to make and use the same.

Our invention consists of various improvements in or relating to aeroplanes, or any similar device or apparatus such as monoplanes, biplanes, triplanes, multiplanes or any other form of flying machines—all of which will hereafter be termed aeroplanes.

According to our invention the aeroplane is constructed with a view to safety; it has two superimposed planes constructed in three sections. The three sections can be readily connected for flight and as readily disconnected for transport or housing; the middle section carries the port and starboard main planes, and the chassis or undercarriage, the elevator, tail and rudder, motors, propellers, air engine, and levers for operating the main planes. The main port and starboard planes can be moved dihedrally from the horizontal to 15 degrees or to any lesser or greater degree at the will of the aviator.

At the extremities of the top port and starboard main planes are attached ailerons. These are connected to the top port and starboard main planes by laminated springs, or hinges, or similar or other means. The ailerons are connected together above and below by wire cords 1, or other suitable means and to a control, that is free to move, and be moved; said control being fixed to the chassis or undercarriage convenient to the operator. The ailerons being thus connected it necessarily follows that when one is raised the other is depressed to the same degree and vice versa. They can be so operated whether the port and starboard sections of the main planes are level or are raised at a dihedral angle. When the port and starboard sections of the main planes are raised as aforesaid, the ailerons are drawn downward relatively to the dihedral angle of the said sections in such a way that when those sections are raised to 15 degrees the ailerons are level. This reduces the slip of atmospheric pressure at the ends of the planes which would increase as the dihedral angle is increased, but for this use of these ailerons. Other angles of adjustment for the ailerons may however be used. In starting the aeroplane, the port and starboard sections of the main planes are raised at a dihedral angle, the motor is started, and when sufficient initial velocity has been attained, the said sections of the main planes are quickly brought level in order to rise quickly or to clear an object in front of the aeroplane and the same operation may be effected for similar purposes when the machine is traveling in the air with the port and starboard sections of the main planes elevated as aforesaid. Another advantage is that in coming to earth (*i. e.* in landing) when the motors have been stopped or in gliding down when the motors for any reason stop, the port and starboard sections are elevated as aforesaid to any desired degree, thus insuring a safe gliding descent. In gliding down with planes elevated another advantage is that in landing the planes can be brought level quickly when near the ground to reduce the shock of landing.

The aeroplane may be flown with the planes level or elevated as aforesaid (apart from gliding down) and particularly in rough weather. A single vertical rudder is used, and the center of elevator and tail are in line with top planes, all controls being conveniently placed for the operator. The elevating planes being set out at a greater distance from the front of the main planes than the distance from the rear of the main planes to the tail planes (the former distance being approximately one and one-third times the latter distance) insures the gliding down of the aeroplane when the motors stop or are stopped.

The method of propulsion is by two independent motors 2 and 3 each of which is capable of sustaining the machine in flight and operating independent propellers D and D¹, one propeller in front of the main planes and one at the rear of the main planes. These propellers are in alinement, and the rear propeller revolves in the opposite direction to that of the front propeller and also at a greater number of revolutions per minute or with a greater pitch. The motors may be used alternatively in flight, or both may be used at the same time for increased speed. These motors, and the aviator's seat, are placed below the bottom main plane, and the center of each propeller is midway between the top and bottom main planes, and in line with the center line of the aeroplane.

The main planes are cambered from front to rear, in what is known as the flattened S curvature, being curved downward at the front and upward at the rear, but the ordinary or any curvature may be used.

The combination of low center of gravity with the ability to vary the dihedral angle of the main port and starboard planes, together with the position of ailerons and their movements automatic and otherwise, in conjunction with relative centers of pressure, and gravity, form a machine that is comparatively immune from the usual prevailing accidents.

To fully describe the invention, reference is now made to the drawings in which:—

Figure 2:
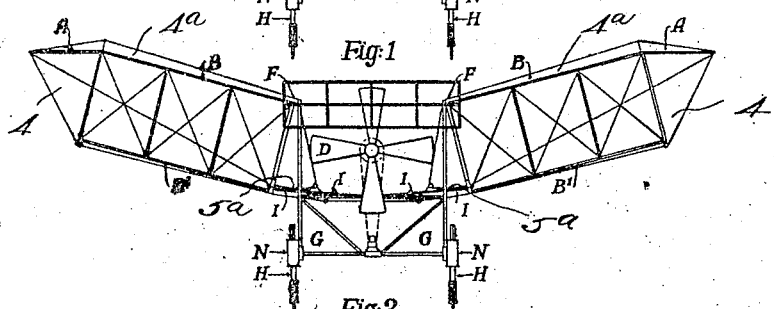
Figure 3:
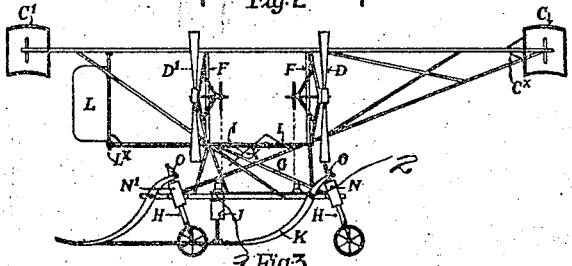
Figure 4:
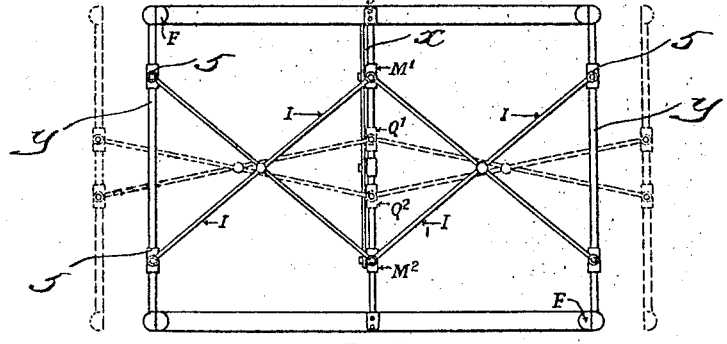

Figure 1, is a front view with planes closed. Fig. 2, is a front view with planes open, that is raised with dihedral angle. Fig. 3, side elevation. Fig. 4, plan of levers in middle section fixed on top side of lower plane, by which the port and starboard sections are raised at dihedral angles and are closed again, or brought level. Figs. 5 and 6, section and plan of wheels and skids and absorbers. Fig. 7, control for air engine, and; Figs. 8 and 9, are elevation and plan views of the air engine and reservoir.

Referring to Figs. 1 and 2 A—A are the ailerons or flaps, each of which is hinged to the outer edge of the top of the main plane, and a cord or wire 4 connects the aileron at its outer end to the main frame. A similar cord or wire $4^a$ connects the aileron to a resilient arm $5^a$ carried by the bi-plane. The two resilient arms $5^a$ are secured to the planes $B^1$ of the bi-plane and project inwardly toward the seat for the aviator. In operation, the cords 4 tend to flex the ailerons A when the bi-planes are elevated, and the resilient arms $5^a$ and the cords $4^a$ tend to restore the ailerons to normal position when the bi-planes are lowered.

B B and $B^1$ $B^1$ are the port and starboard main planes, B B are the top port and starboard main planes and are connected to the middle section by hinges; these hinges cover the distance between the front and rear stanchions F F of the middle section. The lower planes $B^1$ $B^1$ are connected by crossed levers I I by which they are moved dihedrally up to 15 degrees or more or less as desired.

The means for moving the planes B and $B^1$ consists of the crossed levers I having their adjoining ends connected to sleeves $M^1$ and $M^2$ that are slidably mounted on the bar X of the main frame. The free ends of said levers I are each provided with similar sleeves 5 that are slidably mounted on bars Y of the frame of the planes $B^1$. Said levers I and bars Y are adapted to be moved between those positions indicated in full and dash lines in Fig. 4, and the means for effecting which consists of manually and mechanically actuated devices. The manually actuated device consists of a lever 6 pivotally mounted on the bar X and connected to the slidable sleeves $M^1$ and $M^2$ through the medium of links 7 and 8. Said lever 6 is located within convenient reach of the aviator, and by whom it is operated for regulating the inclination of the planes $B$ and $B^1$. The mechanical means for actuating the levers I consists of a cylinder R having a piston rod 9 adapted to be connected with either of the sleeves $M^1$ or $M^2$. Said piston rod is actuated through the medium of compressed air within the cylinder R, and which is supplied thereto from a suitably charged reservoir or tank 10, that connects with said cylinder R at opposite ends through the medium of a pipe 11. The pipe 11 is provided with valves 13 and 14 controlling the admission and exhaust respectively to the cylinder R.

G G is the chassis or undercarriage made of wood, or steel tube or other suitable material; this carries the aviator, motors, wheels and skids, and may be made of the form shown or other suitable form. We place the aviator's seat and our motors (in this case petrol motors but any suitable motor may be used) below the lower planes to secure stability.

Fig. 3—The elevator C is placed 16 feet from the front edge of main planes and is 12 feet by 2 feet 8 inches. The tail $C^1$ is placed 12 feet from rear edge of main planes and is of the same dimensions as the elevator. We are not bound by these dimensions.

The tail is a fixture horizontally—and both elevator and tail have their centers in line with the top planes; this position of the elevator and tail adds to stability. Further the horizontal position of the elevator is maintained automatically by means of two tested helical springs (or other mechanism may be used) so that any slip of the aviator will be rectified automatically so that when not controlled the aeroplane steers itself horizontally. The propellers D and $D^1$ are placed centrally between the main planes in the middle section of the aeroplane—$D^1$ running at a higher number of revolutions or having a greater pitch and also revolving in the opposite direction from D. These propellers are driven by independent motors, and the thrust of $D^1$ is in the same line as that of the thrust of D.

The rudder L Fig. 3 is a single vertical plane 6 feet by 2 feet 6 inches, worked by control suitably fixed in connection with aileron control as is usual. The rudder is maintained in a straight line by two tested helical springs $L^x$ or other like means, unless moved by the aviator.

Fig. 5, is a section, Fig. 6 a plan of wheels and skids attached to undercarriage to absorb shock on landing.

The pneumatic cylinders N, $N^1$ and J are attached to frame of undercarriage, the rods H and $H^1$ pass through pneumatic cylinders N, $N^1$, the wheels are fixed on bottom end of rods H and $H^1$. At the top end of said rods are fixed swinging links O O connecting to skids K. Air-tight pistons attached to rods work within cylinders; between top covers of cylinders, and piston head are helical springs, which springs serve two purposes; that is, they assist to absorb shock and return pistons to bottom of cylinders, their normal position. As the piston moves toward top of cylinder the inclosed air is forced through orifice P at a rate that is calculated to prevent shock, with the aid of the springs. The skids K are connected so as to come into action when pistons are about half stroke, the swinging links O O are made of sufficient length and connected forward of center line so that when the links O O are nearly vertical the skids K are in action; the said cylinders and rods with pistons and springs, may with advantage be used in connection with this skid arrangement in avoiding shock.

From our description it is clear that the present invention embodies a safer aeroplane than the machines in use. Independent motors and propellers, a low center of gravity, main planes capable of elevation, ailerons connected as described, and working automatically or otherwise, elevator and rudder kept in their respective positions automatically, the position of elevator and tail, all combine to insure safety to the aviator.

What we do claim as our invention, and desire to secure by Letters Patent is:—

1. In an aeroplane, the combination of a main frame; bi-planes rigidly connected together and hingedly connected to said main frame at either side thereof; a pair of ailerons flexibly secured to the top planes of said bi-planes; a pair of resilient arms secured to said bi-planes; cords connecting the ailerons to the main frame whereby to flex the ailerons through the elevating movement of the bi-planes; and cords connecting the ailerons with said flexible arms whereby to restore the ailerons to normal on the lowering movement of the bi-plane, substantially as described.

2. In an aeroplane, the combination of a main frame; bi-planes rigidly connected together and hingedly connected to said main frame at either side thereof; means for actuating said planes comprising sleeves slidably mounted on the main frame, sleeves slidably mounted on said bi-planes, crossed levers connecting said sleeves, and an actuating lever connected to said first-named sleeves; a pair of ailerons flexibly secured to the top planes of said bi-planes; a pair of resilient arms secured to said bi-planes; cords connecting the ailerons to the main frame whereby to flex the ailerons through the elevating movement of the bi-planes; and cords connecting the ailerons with said flexible arms whereby to restore the ailerons to normal on the lowering movement of the bi-plane, substantially as described.

In testimony whereof, we affix our signatures, in presence of two witnesses.

WILLIAM FRANCIS WILES.
THOMAS MACLEOD.
FREDERICK WILLIAM WILES.

Witnesses:
E. GARLAND ABELL,
OLIVE K. ABELL.